United States Patent [19]

Chong

[11] E Re. 30,727

[45] Reissued Sep. 1, 1981

[54] CABLE DISPENSER

[76] Inventor: Robert S. Y. Chong, 98-1137 Kaonhoi St., Aiea, Hi. 96701

[21] Appl. No.: 27,461

[22] Filed: Apr. 5, 1979

Related U.S. Patent Documents

Reissue of:

[64] Patent No.: 4,015,795
Issued: Apr. 5, 1977
Appl. No.: 625,891
Filed: Oct. 28, 1975

[51] Int. Cl.[3] ..... B65H 49/00; B65H 75/30

[52] U.S. Cl. ..... 242/85; 242/54 R; 242/105; 242/129

[58] Field of Search ..... 242/85, 105, 103, 106, 242/128, 129, 86, 78.6, 141, 146, 55, 55.54, 55.42, 54 R; 191/12.2 R, 12.4

[56] References Cited

U.S. PATENT DOCUMENTS

| | | | |
|---|---|---|---|
| 1,465,818 | 8/1923 | Gunn | 242/105 |
| 1,488,541 | 4/1924 | Hasen | 242/85 |
| 2,300,243 | 10/1942 | Zierden | 242/86 |
| 3,392,960 | 7/1968 | Bye | 242/105 |
| 3,512,728 | 5/1970 | Johnson | 242/78.6 |

*Primary Examiner*—Stanley N. Gilreath
*Attorney, Agent, or Firm*—Schapp and Hatch

[57] ABSTRACT

A cable dispenser including a fixed stand with a rotatable cable turntable mounted concentrically within a rotatable pan which has a payout slot formed therethrough. Cable may be pulled from the dispenser at any angle and the structure provides an inherent braking action when pulling on the cable ceases.

10 Claims, 2 Drawing Figures

CABLE DISPENSER

Matter enclosed in heavy brackets [ ] appears in the original patent but forms no part of this reissue specification; matter printed in italics indicates the additions made by reissue.

BACKGROUND OF THE INVENTION

The prior art is replete with examples of a fixed stand having a rotatable turntable thereon supported by a ball hearing assembly, such as the show stand disclosed in U.S. Pat. No. 485,109 and the shelf attachment in U.S. Pat. No. 719,625 and the ball bearing stands disclosed in U.S. Pat. Nos. 1,102,128 and 2,491,585. In U.S. Pat. No. 764,389, a shelf having a rotatable but open reel hereon for paying out rope, cord, etc. is disclosed.

However, the prior art does not disclose an enclosed cable dispenser or caddy for paying out cable such as plastic coated cable employed in household wiring, the dispenser being constructed so as to pay out cable in any direction and automatically stops paying out cable merely by terminating a pull on the cable, the cable dispenser requiring no braking means per se as a part of its structure.

SUMMARY OF THE INVENTION

Therefore, it is a principal object of the invention to provide a cable dispenser or payout device having a rotatable pan having a cable dispensing slot and enclosing an independently rotatable turntable for a cable supply whereby cable may be paid out in any direction and the dispenser is self braking to stop payout of cable even though no braking means per se are provided in the structure.

It is another object of the invention to provide a cable dispenser having a rotatable pan enclosure with a rotatable cable turntable therein, cable being paid out tangentially from the dispenser through an opening in a wall of the pan whereby the entire dispenser may be rotated about a vertical axis on its base to any direction for conveniently paying out cable.

It is a further object of the invention to provide a cable dispenser having a cable supply turntable rotatably mounted within a pan enclosure having a detachable cover thereon for convenient replenishing of the supply of cable in the dispenser and for preventing overlapping uncoiling of cable from the dispenser with possible subsequent jamming of cable in the dispenser.

It is yet another object of the invention to provide a cable dispenser having detachable support legs so that the dispenser may be taken through narrow openings to relatively inaccessable locations.

Further novel features and other objects of this invention will become apparent from the following detailed description, discussion and the appended claims taken in conjunction with the accompanying drawings.

BRIEF DESCRIPTION OF DRAWINGS

A preferred structural embodiment of this invention is disclosed in the accompanying drawings in which.

DESCRIPTION OF THE PREFERRED EMBODIMENT

Figure 1:
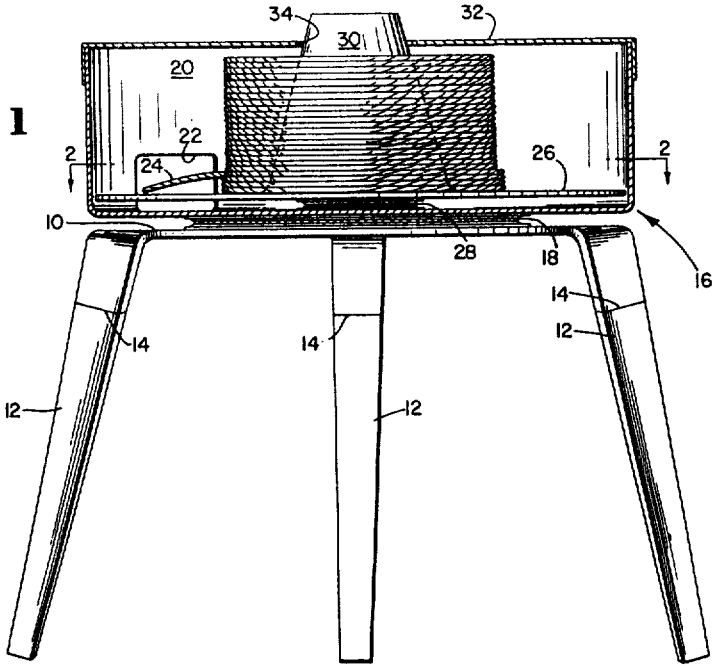
FIG. 1 is an elevation view of the invention, partly in section to show interior details.
Figure 2:
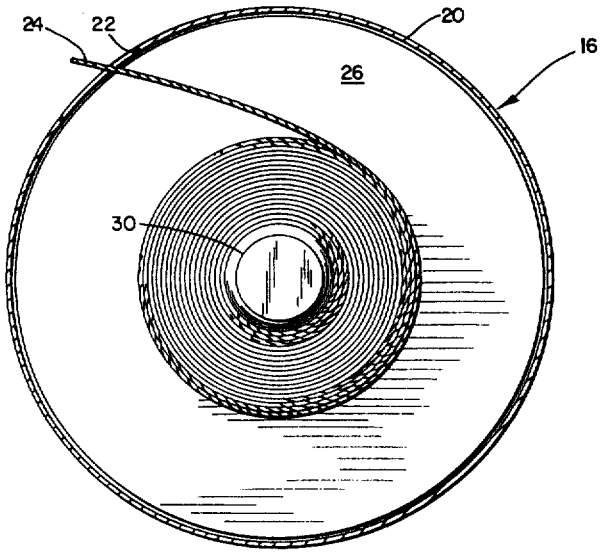
FIG. 2 is a sectional view taken along lines 2—2 of FIG. 1.

The cable dispenser of this invention includes a fixed base in the form of a generally circular table 10 having but three legs 12 dependent therefrom so that table 10 may be firmly situated on any even or uneven support surface therebeneath (not shown). Legs 12 are each detachable from table 10 at 14 so that the cable dispenser may be taken through narrow openings to relatively inaccessable locations to pay out cable.

A container or generally cylindrical, upwardly open pan 16 is rotatably mounted on table 10 by means of a first ball bearing assembly 18. Pan 16 includes a surrounding upstanding cylindrical wall 20 having dispensing opening 22 formed therethrough for tangentially paying out cable 24 from a supply of cable coiled upon a turntable 26 which is rotatably mounted on pan 16 by a second, smaller diameter ball bearing assembly 28. Formed integrally with turntable 26 is a cable centering cone 30 which extends vertically upwardly beyond a horizontal plane defined by the upper circumferential edge of pan wall 20. A circular cover or lid 32 has friction fit onto pan wall 20 and includes a central opening 34 through which the upper terminal end of cone 30 passes for the reasons set forth below.

Since pan 16 is freely rotatably mounted on table 10, it may be rotated to any attitude, through 360° in a horizontal plane, for paying out of cable in any direction desired by the user. Also, tension on cable 24 caused by pulling the cable through dispensing opening 22 automatically turns pan 16 to a position wherein opening 22 is aligned with the direction of pull upon cable 24. Additionally, pan 16 is stabilized in that attitude, once reached, by the pull being exerted on cable 24. In this manner, pan 16 is quickly rotated to a payout disposition by the user with no more attention being paid to the cable dispenser other than a simple tug on cable 24.

Of course turntable 26 is rotatably mounted on and within pan 16 so that cable may be withdrawn through opening 22, turntable 26 rotating while pan 16 remains relatively stationary.

When payout ceases as by terminating a pull on cable 24, turntable 26 continues to rotate with respect to relatively stationary pan 16. Since cable is no longer being pulled through opening 22, coils of cable 24 within wall 20 on turntable 26 will expand rather rapidly outwardly until they contract the inner surface of wall 20. At that time, the frictional engagement of coils of cable 24 against wall 20 abruptly terminates rotation of turntable 26 with respect to pan 16 the dispenser stops.

Cover 32 is provided with centering cone 30 protruding therethrough so that during the braking action just described, coils of cable 24 will not jump over the cone 30, thus looping itself in an unorderly fashion, and possibly jam in the dispenser, rendering it inoperable. On the contrary, all that is needed to begin dispensing again is another outward pull on cable 24. Of course, cover has friction fit onto wall 20 or is otherwise suitably detachably mounted therefrom so that the cover 32 may be removed to replenish the supply of cable 24.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A cable dispenser comprising a relatively stationary base, a cable dispensing control member having a bottom and an upstanding substantially cylindrical side wall, means mounting said member on said base for free rotation about the axis of said side wall, a turntable for supporting a coil of cable disposed within said member, means mounting said turntable on the bottom of said member for free rotation about said axis independently of rotation of said member, and means providing a dispensing opening at said wall through which the cable may be withdrawn from the dispenser, whereby when cable is pulled out through said opening said member is automatically oriented to align said opening with the cable payout direction while said turntable is free to relatively rotate as the cable is pulled out of the dispenser.

2. The cable dispenser defined in claim 1, wherein said wall surrounds the coil on said turntable in such relation that upon cessation of payout pull on the cable coils of cable within the member expand into friction contact with said wall and thereby arrest rotation of the turntable to prevent further payout of cable from the dispenser.

3. The cable dispenser defined in claim 1 wherein said member is pan-shaped and is provided with a cover having an opening on said axis, and said turntable has a central coil mounting cone extending upwardly into said cover opening.

4. The cable dispenser defined in claim 3 wherein the turntable is substantially parallel to the bottom of said pan-shaped member and said dispensing opening is near the lower end of said wall.

5. The cable dispenser defined in claim 1, wherein said base has a plurality of detachable support legs.

6. The cable dispenser defined in claim 1, wherein said mounting means for the cable dispensing control member and the turntable are concentric ball bearing assemblies.

7. A cable dispenser comprising: a fixed base; a generally cylindrical, upwardly open pan having a surrounding wall; first means for rotatably mounting said pan on said base; turntable means for supporting a coiled supply of cable and being located on said pan within said wall; second means for rotatably mounting said turntable means on said pan; means defining a cable dispensing opening in said pan wall; means for retaining cable within said pan in a coiled condition on said turntable means during payout of cable from said cable dispenser whereby, upon abrupt cessation of paying out of cable from said cable dispenser, said turntable may rotate with respect to said pan to cause coils of cable on said turntable to expand outwardly against said pan wall to thereby arrest rotary motion of said turntable with respect to said wall; said means for retaining said cable in a coiled condition on said turntable means comprising a centering cone, formed concentrically centrally on said turntable and extending vertically upwardly therefrom beyond a horizontal plane defined by the upper terminal circumference of said pan wall, a cover on said pan wall extending over said turntable and being removable from the pan wall to replenish said cable dispense with a supply of cable, said cover including means defining an opening centrally therein, and said turntable centering cone extending upwardly therethrough whereby cable coiled about said cone on said turntable may be removed from said turntable only by being fed tangentially from said turntable through said pan wall dispensing opening.

8. A cable dispenser as claimed in claim 7 wherein said turntable and centering cone are integrally formed together as a one piece member.

9. A cable dispenser comprising: a fixed table assembly having a generally horizontal support surface and at least three supporting legs each being detachable from said support surface; a generally cylindrical, upwardly open pan on said support surface and having an upstanding wall therearound; first bearing means for freely rotatably mounting said pan on said support surface; an integrally formed upwardly open reel for a supply of cable, located within said pan and comprising a generally circular turntable having a centrally disposed cable centering cone extending upwardly therefrom above a horizontal plane defined by upper terminal edge of said wall; second bearing means for freely rotatably mounting said turntable on said pan within said wall; a cover on said pan being removably friction fit on said wall and having means defining an opening centrally therethrough, said cone extending upwardly therethrough in assembly; and means defining a cable dispensing opening through said pan wall for feeding cable tangentially outwardly from said cable dispenser by pulling on a cable end extended through said dispensing opening, said cable dispenser abruptly ceasing dispensing of cable upon terminating pulling of cable from said dispenser due to coils of cable on said turntable expanding outwardly against said wall to arrest relative movement between said wall and turntable.

*10. A cable dispenser comprising a relatively stationary base, a cable dispensing control member having a bottom and an upstanding substantially cylindrical side wall, means mounting said member on said base for free rotation about the axis of said side wall, a turntable for supporting a coil of cable disposed within said member, means mounting said turntable for free rotation about said axis independently of rotation of said member, and means providing a dispensing opening at said wall through which the cable may be withdrawn from the dispenser, whereby when cable is pulled out through said opening said member is automatically oriented to align said opening with the cable payout direction while said turntable is free to relatively rotate as the cable is pulled out of the dispenser.*

* * * * *